(12) United States Patent
Sparks et al.

(10) Patent No.: US 9,319,431 B2
(45) Date of Patent: *Apr. 19, 2016

(54) METHODS, SYSTEMS, AND COMPUTER READABLE MEDIA FOR PROVIDING SEDATION SERVICE IN A TELECOMMUNICATIONS NETWORK

(71) Applicant: Tekelec, Inc., Morrisville, NC (US)

(72) Inventors: Robert James Sparks, Plano, TX (US); Ben Allen Campbell, Irving, TX (US); Adam Boyd Roach, Dallas, TX (US); Ajay Padmakar Deo, Carrollton, TX (US)

(73) Assignee: TEKELEC, INC., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/644,164

(22) Filed: Mar. 10, 2015

(65) Prior Publication Data

US 2015/0249689 A1    Sep. 3, 2015

Related U.S. Application Data

(62) Division of application No. 12/533,617, filed on Jul. 31, 2009, now Pat. No. 9,001,664.

(60) Provisional application No. 61/085,115, filed on Jul. 31, 2008.

(51) Int. Cl.
   *H04L 29/14*    (2006.01)
   *H04L 29/06*    (2006.01)
   (Continued)

(52) U.S. Cl.
   CPC .......... *H04L 65/1006* (2013.01); *H04L 65/105* (2013.01); *H04L 65/80* (2013.01); *H04L 69/40* (2013.01); *H04W 28/12* (2013.01); *H04W 80/10* (2013.01)

(58) Field of Classification Search
   CPC ... H04L 65/80; H04L 65/1006; H04L 65/105; H04L 69/40
   See application file for complete search history.

(56) References Cited

U.S. PATENT DOCUMENTS 7,903,672 B1    3/2011    deRuijter et al.
9,001,664 B2    4/2015    Sparks et al.
(Continued)

FOREIGN PATENT DOCUMENTS

CN    200980138725.4    9/2014
EP    1 478 157 A1    11/2004

OTHER PUBLICATIONS

Notice of Allowance and Fee(s) Due & Applicant-Initiated Interview Summary for U.S. Appl. No. 12/533,617 (Dec. 5, 2014).
(Continued)

*Primary Examiner* — Gregory Sefcheck
*Assistant Examiner* — Jenkey Van
(74) *Attorney, Agent, or Firm* — Jenkins, Wilson, Taylor & Hunt, P.A.

(57) ABSTRACT

Methods, systems, and computer readable media for providing sedation service in a telecommunications network are disclosed. According to one aspect, a method for providing sedation service in a telecommunications network is provided. The method includes steps that are performed at a session initiation protocol (SIP) sedation node. The method includes receiving a first message sent from a SIP user agent and intended for a SIP server. The method further includes determining whether the SIP server is unavailable. The method further includes responsive to a determination that the SIP server is unavailable to respond to the first message, sending, to the SIP client, a SIP sedation message for reducing the number or frequency of messages sent by the SIP user agent to the SIP server.

23 Claims, 7 Drawing Sheets

(51) Int. Cl.
*H04W 28/12* (2009.01)
*H04W 80/10* (2009.01)

(56) References Cited

U.S. PATENT DOCUMENTS

| | | | |
|---|---|---|---|
| 2002/0035642 | A1 | 3/2002 | Clarke et al. |
| 2003/0210649 | A1 | 11/2003 | Bondi |
| 2004/0205190 | A1 | 10/2004 | Chong et al. |
| 2004/0228352 | A1* | 11/2004 | Constantinof ........... 370/395.21 |
| 2005/0091388 | A1 | 4/2005 | Kamboh et al. |
| 2005/0094582 | A1 | 5/2005 | Forissier et al. |
| 2006/0193252 | A1 | 8/2006 | Naseh et al. |
| 2007/0121515 | A1 | 5/2007 | Donovan et al. |
| 2008/0120715 | A1 | 5/2008 | Bhargava et al. |
| 2008/0123640 | A1 | 5/2008 | Bhatia et al. |
| 2009/0254649 | A1* | 10/2009 | Coffey et al. ................. 709/224 |
| 2010/0027532 | A1 | 2/2010 | Sparks et al. |

OTHER PUBLICATIONS

Letter regarding Notification of Grant for Chinese Patent Application No. 200980138725.4 (Jul. 23, 2014).
Final Office Action for U.S. Appl. No. 12/533,617 (Jul. 21, 2014).
Second Office Action for Chinese Application No. 200980138725.4 (Jan. 17, 2014).
Non-Final Office Action for U.S. Appl. No. 12/533,617 (Dec. 9, 2013).
Extended European Search Report for European Patent Application No. 09803656.9 (Aug. 9, 2013).
Final Official Action for U.S. Appl. No. 12/533,617 (May 14, 2013).
First Office Action for Chinese Patent Application No. 200980138725.4 (May 9, 2013).
Non-Final Official Action for U.S. Appl. No. 12/533,617 (Jul. 11, 2012).
Notification of Transmittal of the International Search Report and the Written Opinion of the International Searching Authority, or the Declaration for International Application No. PCT/US2009/052421 (Mar. 9, 2010).
Bhatia et al., "SIP Proxy Discovery Using Anycast Address," IETF SIP Working Group, draft-rbhatia-anycast-sip-proxy-discovery-00.txt, pp. 1-15 (Nov. 10, 2006).
Fokus, "Report on Integration of SIP and IPv6," IST-2001-32603, (Sep. 30, 2003).
Roach, "Session Initiation Protocol (SIP)—Specific Event Notification;" Network Working Group, RFC 3265, pp. 1-36 (Jun. 2002).
Kumar et al., "Evaluation of IPV6 Services for Future Aviation Networks," Computer Networks & Software, Inc., and Comptel, Inc., pp. 1-21 (Publication Date Unknown).
Communication Pursuant to Article 94(3) EPC for European Patent Application No. 09803656.9 (Jan. 26, 2015).

* cited by examiner

METHODS, SYSTEMS, AND COMPUTER READABLE MEDIA FOR PROVIDING SEDATION SERVICE IN A TELECOMMUNICATIONS NETWORK

PRIORITY CLAIM

This application is a divisional of U.S. patent application Ser. No. 12/533,617, filed Jul. 31, 2009, which claims the benefit of U.S. Provisional Patent Application Ser. No. 61/085,115, filed Jul. 31, 2008; the disclosures of which are incorporated herein by reference in their entireties.

TECHNICAL FIELD

The subject matter described herein relates to methods and systems for managing traffic in a telecommunications network. More particularly, the subject matter described herein relates to methods, systems, and computer readable media for providing sedation service in a telecommunications network.

BACKGROUND

As a result of the falling price and increasing power of computing systems, personal computers are becoming ubiquitous. With increased access to the Internet, the number of users or subscribers to telecommunication networks has also increased. As the size and weight of computing systems rapidly decrease, there has been an enormous increase in the number of mobile computing platforms, such as smart phones, personal digital assistants (PDAs), and the like. As a result of this explosive growth in numbers of personal computers and mobile computing platforms, telecommunications network providers have seen an increase in the number of subscribers to the network.

In addition to the increase in the number of subscribers to telecommunications networks, there has also been an increase in the number of services available to these subscribers. Example services include presence service, email, voice mail, caller ID, and others. As the number of services increases, and the number of subscribers to those services also increases, it becomes economically efficient for a telecommunications service provider to create a node or network entity that is dedicated to providing a particular service, rather than having every node in the network provide that service. For example, in a network that uses the session initiation protocol (SIP) to establish media sessions between two nodes in the network, a network provider may set up a node within the network as a SIP proxy/registrar node, to which all SIP user agent clients (UACs) in the network will send SIP registration messages.

There are disadvantages associated with this approach, however. If a service-providing node fails, this may cause an increase in message traffic from the service clients. For example, if the SIP proxy/registrar node described above, fails, the UACs will attempt to re-establish their sessions by issuing registration requests. If a network has a large number of subscribers, this may result in a flood of messages across the network, which may drive the network into a congested state. In addition, if and when the failing node recovers, the flood of messages directed to the node may overwhelm the node, causing further congestion and potentially causing the node to fail again. Even if the node continues to operate, it will attempt to respond to all of the messages received, effectively doubling the amount of traffic on an already congested network. The situation is worsened if the protocol used allows multiple reconnection retries—the increase in congestion may continue indefinitely, until the node recovers and has a chance to respond to all queries.

Accordingly, in light of these disadvantages associated with conventional network configurations, there exists a need for methods, systems, and computer readable media for providing sedation service in a telecommunications network.

SUMMARY

Methods, systems, and computer readable media for providing sedation service in a telecommunications network are disclosed. According to one aspect, a method for providing sedation service in a telecommunications network is provided. The method includes steps that are performed at a session initiation protocol (SIP) sedation node. The method includes receiving a first message sent from a SIP user agent and intended for a SIP server. The method further includes determining whether the SIP server is unavailable. The method further includes responsive to a determination that the SIP server is unavailable to respond to the first message, sending, to the SIP user agent, a SIP sedation message for reducing the number or frequency of messages sent by the SIP user agent to the SIP server.

According to another aspect of the subject matter described herein, a method for providing sedation service in a telecommunications network is provided. The method includes steps that are performed at a SIP sedation node. The method includes, in response to a SIP server becoming unavailable, receiving a first message sent from a SIP user agent that is intended for the SIP server. The method further includes, in response to receiving the first message, sending, to the SIP user agent, a SIP sedation message for reducing the number or frequency of messages sent by the user agent to the SIP server.

According to yet another aspect of the subject matter described herein, a system for providing sedation service in a telecommunications network is provided. The system includes a session initiation protocol (SIP) sedation node that is configured for receiving a first message sent from a SIP user agent and intended for a SIP server. The sedation server is further configured for determining whether the SIP server is unavailable. The sedation server is further configured for, responsive to a determination that the SIP server is unavailable to respond to the first message, sending, to the SIP user agent, a SIP sedation message for reducing the number or frequency of messages sent by the SIP user agent to the SIP server.

According to yet another aspect of the subject matter described herein, a system for providing sedation service in a telecommunications network is provided. The system includes a SIP sedation node that, in response to a SIP server becoming unavailable is configured for receiving a first message sent from a SIP user agent that is intended for the SIP server. The SIP sedation node is further configured for, in response to receiving the first message, sending, to the SIP user agent, a SIP sedation message for reducing the number or frequency of messages sent by the SIP user agent to the SIP server.

The subject matter described herein for providing sedation service in a telecommunication network may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for providing sedation service during transient events in a telecommunications network. In one embodiment, a sedation server acts on behalf of an unavailable SIP server by receiving messages that are sent by sending user agents to the unavailable target node. In response, the sedation server sends to the user agents messages designed reduce the number and/or the frequency of messages sent by the sending user agents to the target SIP server. The messages sent by the sedation server to the sending user agents may specify an amount of time that the sending user agents must wait before it can send another message to the target node.

Figure 1A:
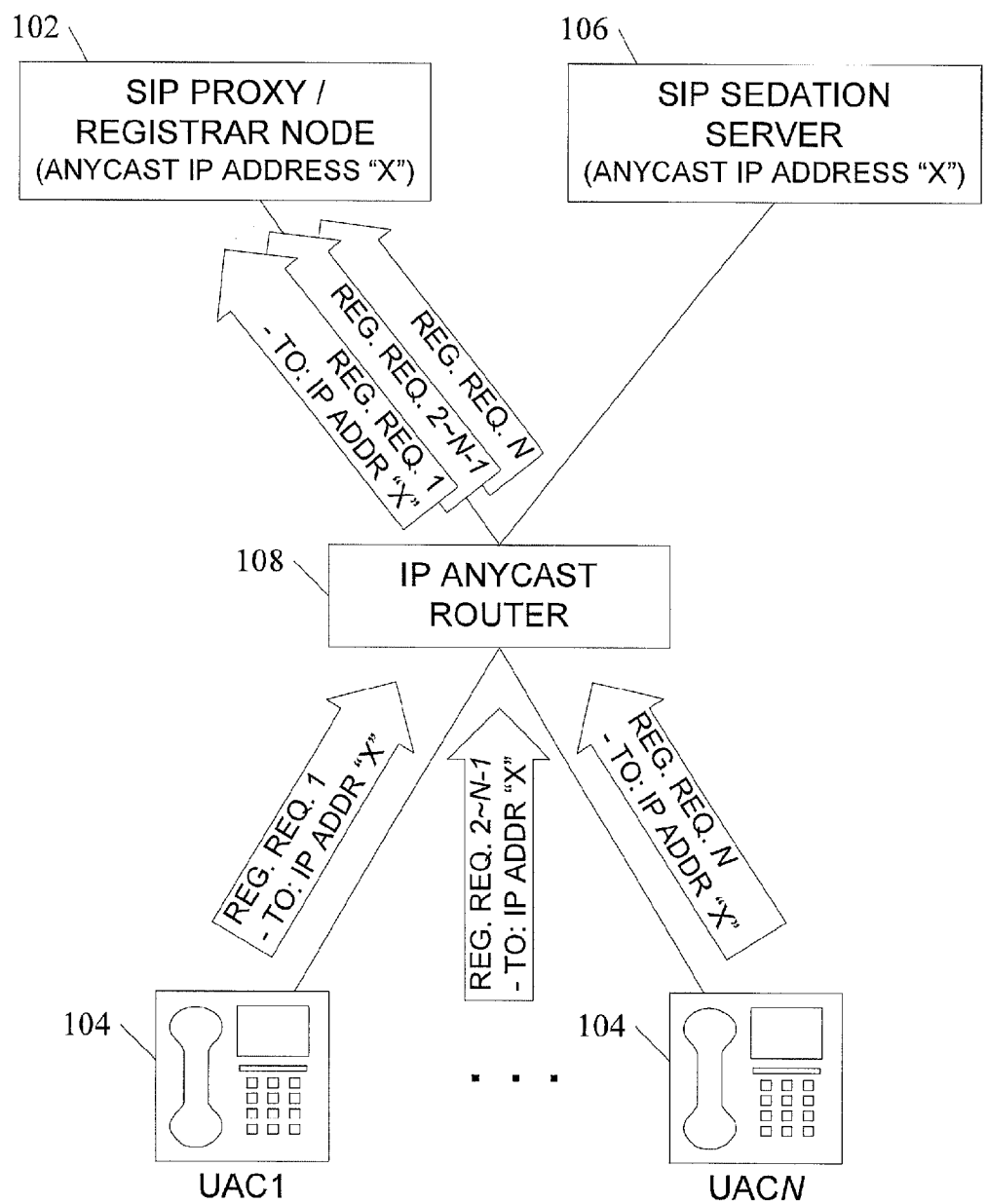
FIGS. 1A~C are block diagrams illustrating an exemplary system for providing a sedation service in a telecommunications network according to an embodiment of the subject matter described herein.
Figure 1B:
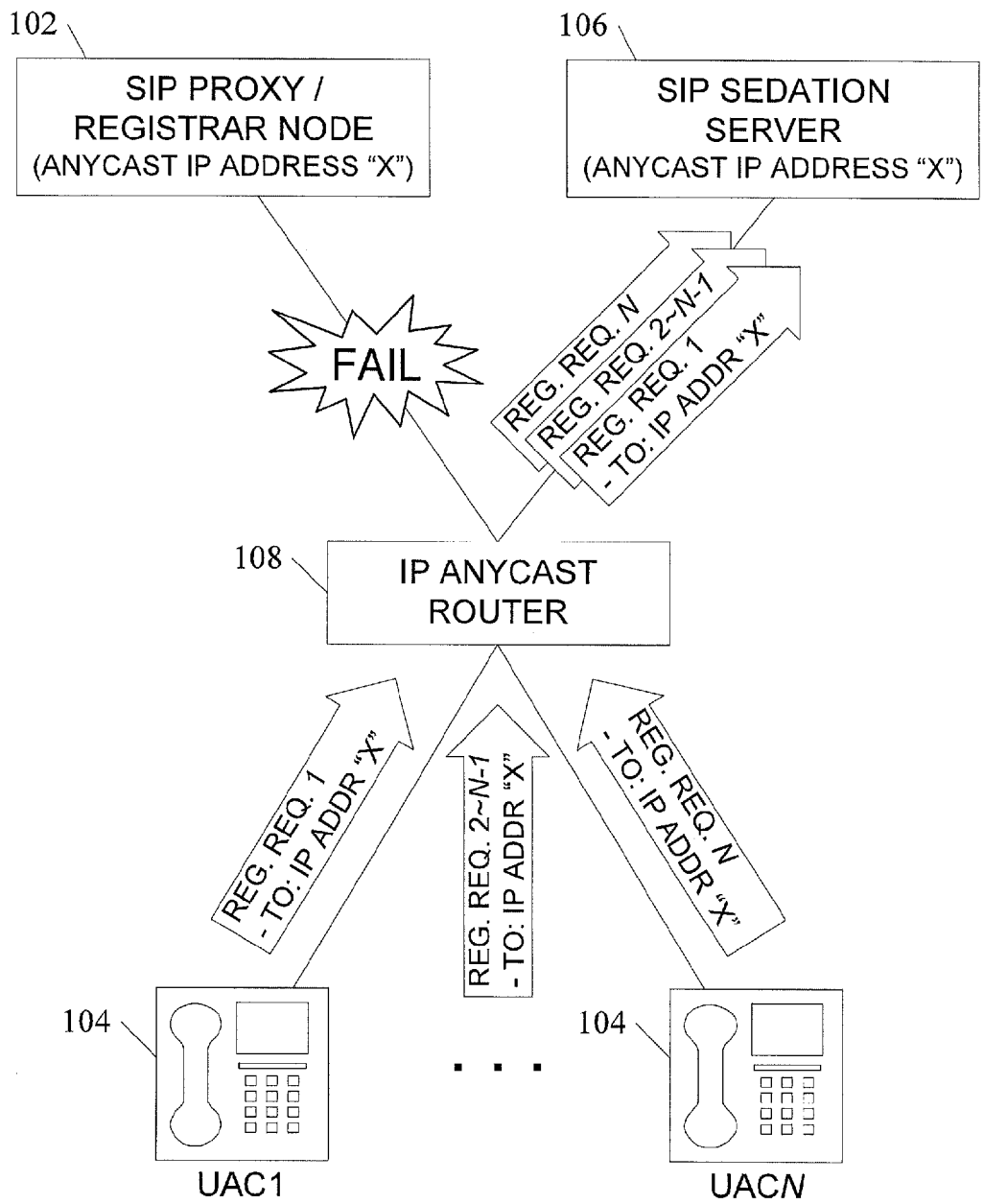
Figure 1C:
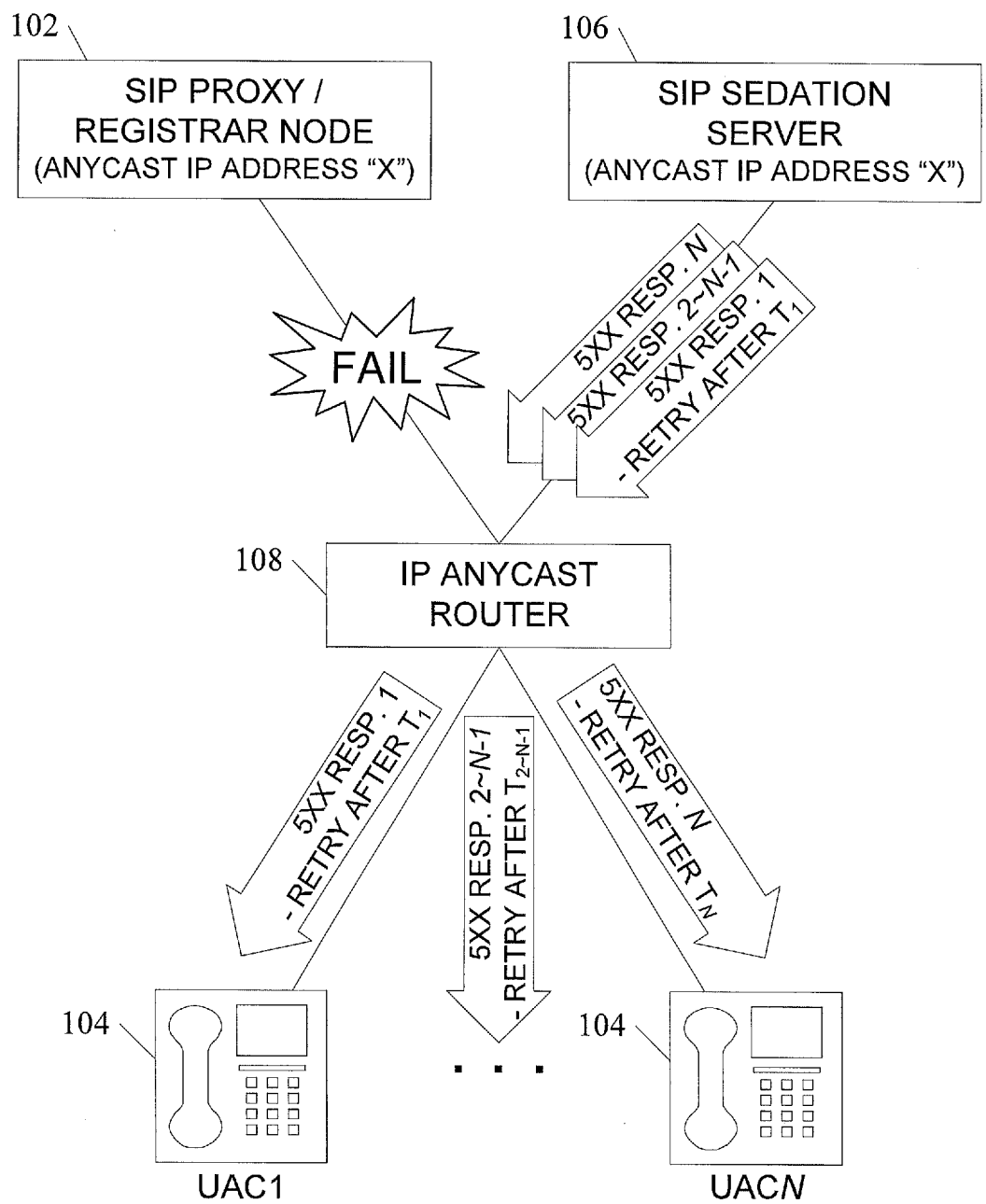

FIGS. 1A~C are block diagrams illustrating an exemplary system for providing a sedation service in a telecommunications network according to an embodiment of the subject matter described herein. In one embodiment, system 100 may include a first node in a telecommunications network that responds to messages received from a second node in the network. For example, in the embodiment illustrated in FIGS. 1A~C, system 100 includes a SIP proxy/registrar node, SIP proxy 102, that responds to SIP registration requests from one or more user agents, such as SIP user agent clients UAC1 through UACN, collectively referred to as UACs 104, although other user agents, such as SIP user agent servers or non-SIP user agents, are also contemplated. The first node may be a node that provides a network service in the telecommunications network. In the embodiments illustrated in FIGS. 1A~C, the telecommunications network supports the SIP protocol, but the subject matter described herein is not so limited. Thus, the first node may be a SIP proxy server, a SIP registrar, a SIP user agent server, an Internet protocol multimedia subsystem (IMS) node, such as a call session control function (CSCF), a SIP or non-SIP presence server, and so on.

In one embodiment, system 100 may include a third node for sending sedation messages to the second node or nodes in response to unavailability of the first node. For example, in the embodiment illustrated in FIGS. 1A~C, system 100 includes a SIP sedation server 106 for sending sedation messages to UACs 104 in response to detection of a failure or other unavailability (for example, out of service due to maintenance or upgrading) of SIP proxy 102. The sedation messages are designed to reduce the number of messages sent by the second node to the first node, the frequency of messages sent by the second node to the first node, or both the number and frequency of messages sent by the second node to the first node. In the embodiment illustrated in FIGS. 1A~C, SIP sedation server 106 sends sedation messages to UACs 104 to reduce the number and/or frequency of messages that UACs 104 send to SIP proxy 102.

In one embodiment, system 100 may include a router 108 for routing the requests from UACs 104 to SIP proxy 102. In the embodiment illustrated in FIGS. 1A~C, router 108 is an anycast router, and both SIP proxy 102 and SIP sedation server 106 are configured to have the same anycast address, IP address "X". As used herein, the term "anycast address" refers to an identifier for a set of interfaces, typically belonging to different nodes. A packet sent to an anycast address is delivered to one of the interfaces identified by that address, i.e., the "nearest" one, according to the routing protocol's measure of distance. In the embodiment illustrated in FIG. 1A, a UAC 104 seeking to register a SIP session may issue a SIP registration request to anycast address "X", which is the address that has been assigned to the SIP registration function. Router 108 intercepts these SIP registration requests and forwards them to the "nearest" node associated with that anycast address, e.g., SIP proxy 102.

An example operation of system 100 is illustrated in more detail in FIGS. 1B and 1C. In the embodiment illustrated in FIG. 1B, SIP proxy 102 is unavailable, due to a failure of the node itself or of a communication link to the node, for example. Router 108 detects the failure of SIP proxy 102 and, in response, redirects all messages that were intended for SIP proxy 102 to another node associated with the Anycast address "X". In one embodiment, system 100 may have one or more redundant SIP proxies. In this scenario, anycast router 108 may choose the next nearest node associated with anycast address "X", i.e., one of the backup SIP proxies. In such a configuration, SIP sedation server would be configured so that it always appears as the "farthest" node to anycast router 108, so that messages will be redirected to SIP sedation server 106 only if all SIP proxies 102 and their redundant backups have failed. In the embodiment illustrated in FIG. 1B, router 108 redirects all SIP registration requests to SIP sedation server 106.

FIG. 1C illustrates the response of SIP sedation server 106 to messages received, such as the SIP registration request messages illustrated in FIG. 1B. SIP sedation server 106 issues a sedation message in response to each of the SIP registration requests received. In other embodiments, SIP sedation server 106 may issue sedation messages in response to other types of SIP messages, including SIP registration requests, SIP subscribe requests, and SIP invite requests. The subject matter described herein is not constrained to embodiments that use SIP. For example, in alternative embodiments, sedation messages may be sent by a non-SIP sedation server, in response to receiving non-SIP messages, including non-SIP registration, subscription, or invitation messages.

In the embodiment illustrated in FIG. 1C, SIP sedation server 106 issues SIP 5XX response messages, which are used to indicate a SIP server error. Other sedation messages that may be sent by SIP sedation server 106 include messages to indicate a process in progress, such as SIP 1XX messages. In one embodiment, the sedation messages may include a "retry after" parameter, which is used to instruct the UAC 104 to wait a specified amount of time before retrying the request.

In one embodiment, SIP sedation server 106 may manipulate the retry after parameters for the purpose of preventing UACs 104 from overwhelming SIP proxy 102 with a flood of requests that occur at the same or nearly the same time. For example, as SIP sedation server 106 issues the SIP 5XX responses to UAC1 through UAC N, SIP sedation server 106 may set the retry parameter T to a progressively increasing value, such that UAC1 is instructed to wait 1 second before attempting to register again, UAC2 is instructed to wait 2 seconds, UAC3 is instructed to wait 3 seconds, and so on. The delay values are for illustrative purposes only: values in the microseconds, milliseconds, minutes, hours, etc., may be more appropriate, depending on the service provided by the failed node, the nature of the node outage, and so on. Alternatively, the specified delay may be the same for every sedation message; the delay may be based on the class of the particular UAC, in which premium clients are instructed to wait less time than regular clients; the delay may be programmatically defined according a pertinent algorithm; the delay may be randomly assigned; and so on. By distributing the retry requests over time, the recovering node, e.g., SIP proxy 102, may avoid being overwhelmed with a flood of retry requests once it has recovered. In addition, temporal distribution of retry requests helps avoid network congestion.

Although FIGS. 1A~C illustrated an embodiment having SIP nodes 102 and 106 and UACs 104, it will be appreciated that the sedation server concept is equally applicable to other networks, including circuit-switched and packet-switched networks, cellular or mobile networks, voice and/or data networks, networks based on Internet protocol (IP), IP multimedia subsystem (IMS) protocols, next-generation networks (NGN), and so on. The subject matter described herein is likewise not limited to SIP registration, but may be applied to network nodes that provide any kind of network service, including nodes that receive and process (and optionally, respond to) other types of messages. The sedation concept may also be applied to any protocol which supports messages which result in a calming of message traffic, e.g., which cause a sending node to send fewer messages, to send messages less frequently, etc., or to temporarily (or even permanently) stop sending messages to an unavailable node. The sedation concept may be applied to one or more classes of messages, messages related to one or more classes of services, or messages directed to one or more classes of service-providing nodes.

Figure 2A:
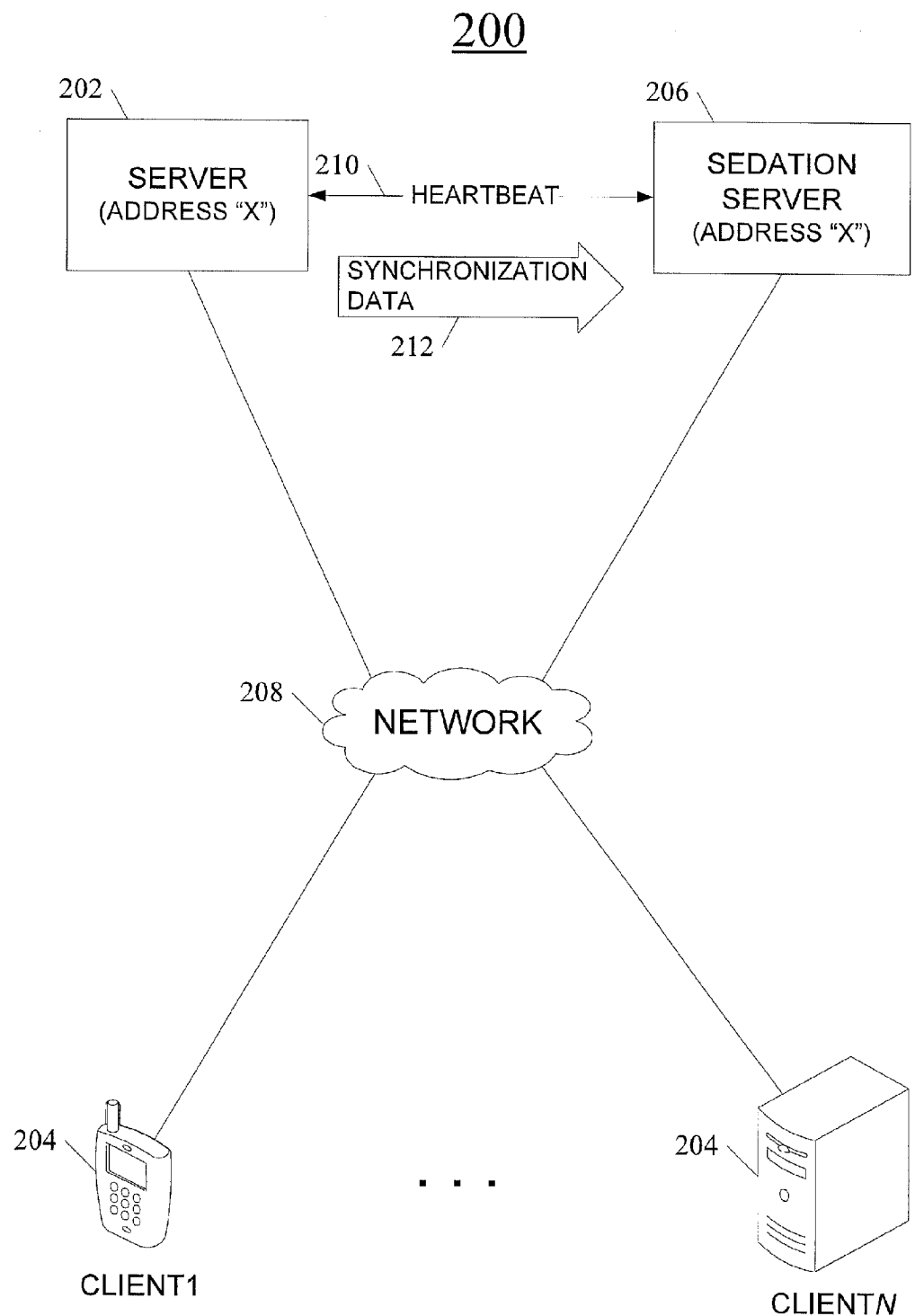
FIGS. 2A~C are block diagrams illustrating an exemplary system for providing a sedation service in a telecommunications network according to another embodiment of the subject matter described herein.
Figure 2B:
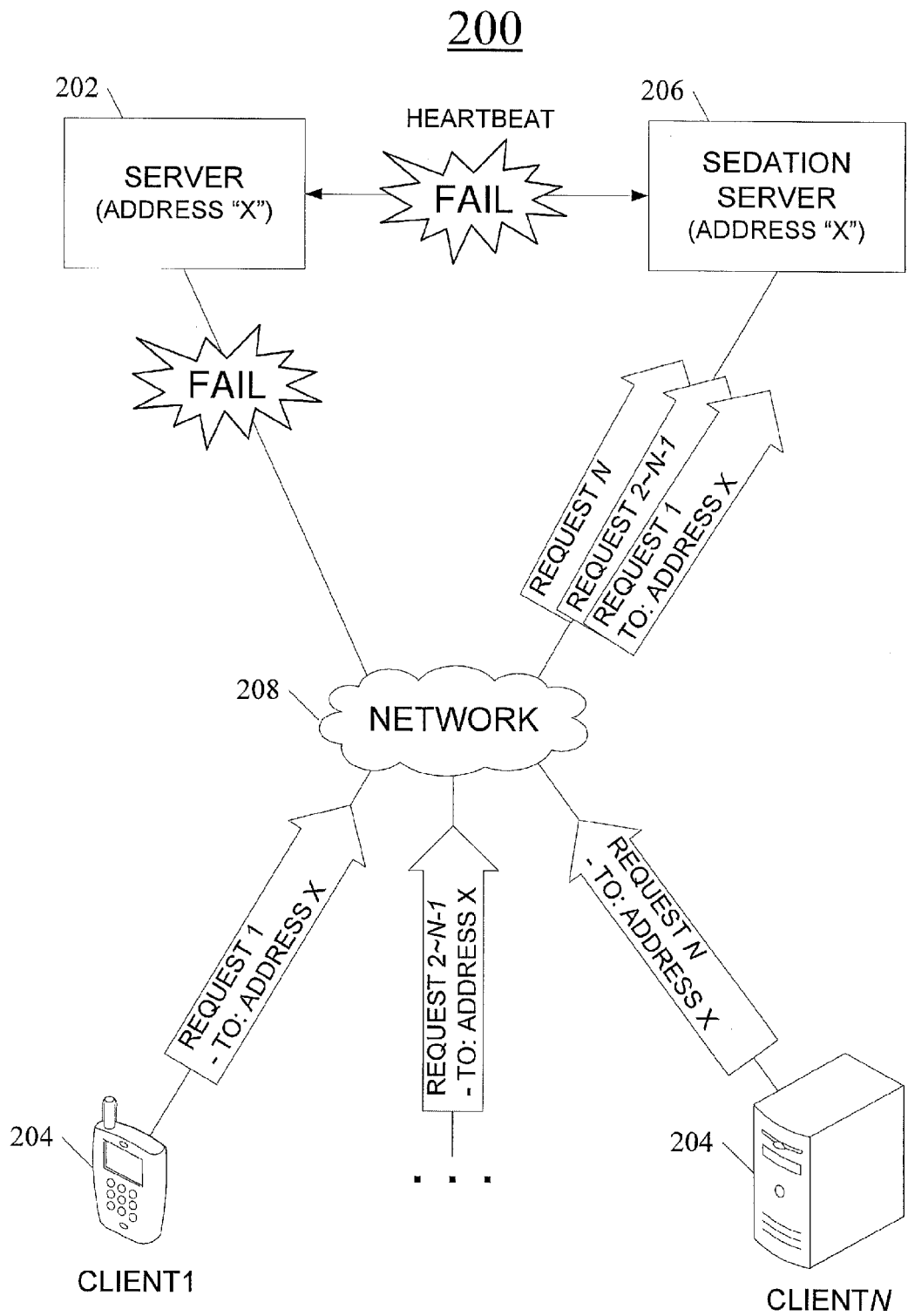
Figure 2C:
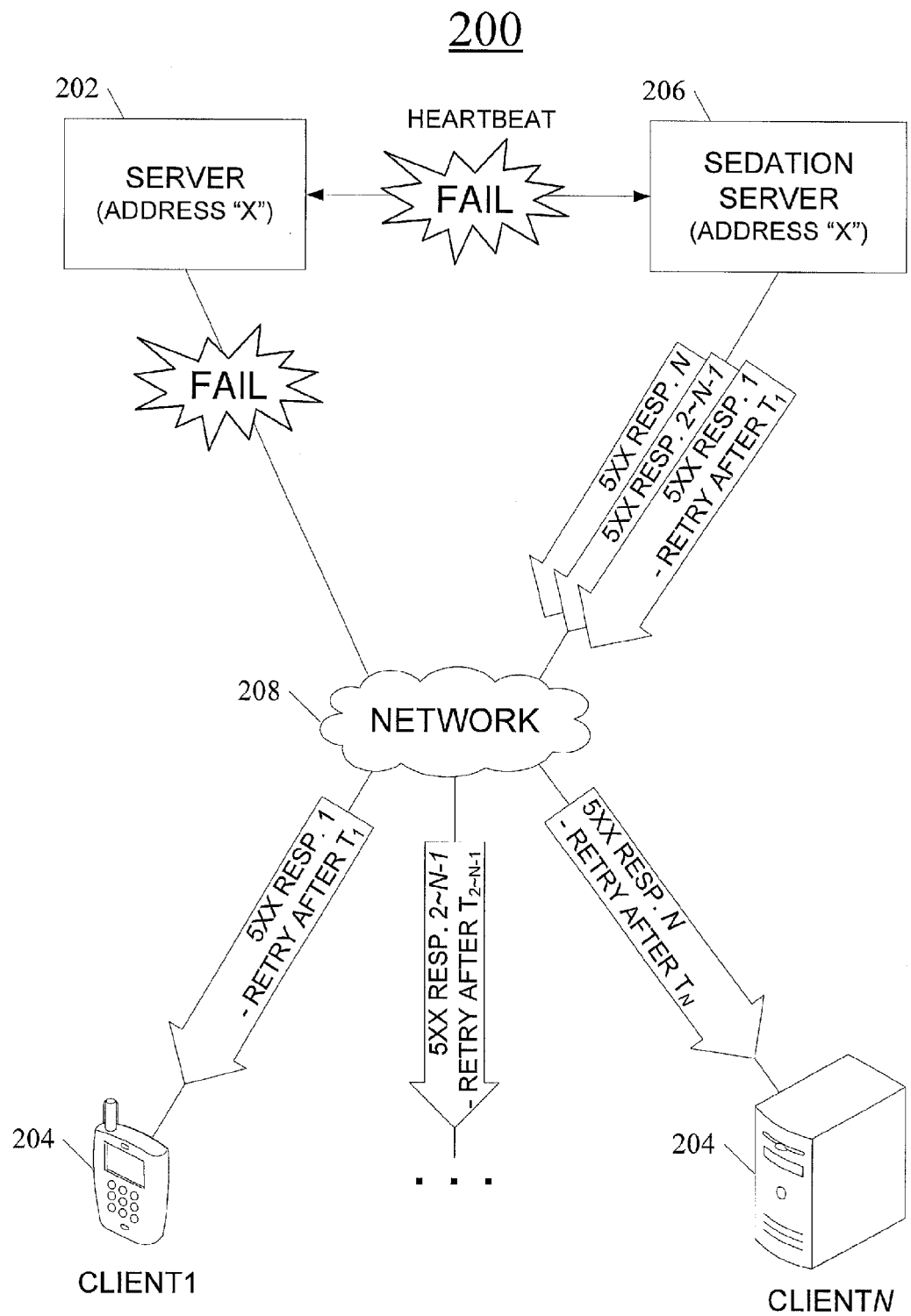

FIGS. 2A~C are block diagrams illustrating an exemplary system for providing a sedation service in a telecommunications network according to another embodiment of the subject matter described herein. In FIG. 2A, system 200 includes a server 202, which provides a network service to one or more clients 204, and a sedation server 206, whose function will be described below. In the embodiment illustrated in FIGS. 2A-C, clients 204 communicate with server 202 and sedation server 206 through network 208. In one embodiment, server 202, clients 204, sedation server 206, and/or network 208 may support the session initiation protocol. Alternatively, other protocols may be supported in addition to or instead of SIP. Other protocols include signaling system 7 (SS7), diameter, simple object access protocol (SOAP), remote authentication dial in user service (RADIUS), Internet protocol (IP), presence or other publication/subscription protocols, such as session initiation protocol for instant messaging and presence leveraging extensions (SIMPLE) and extensible messaging and presence protocol (XMPP), and so on.

In one embodiment, server 202 and sedation server 206 may be configured in a high-availability (HA) configuration or other configuration that provides failover such that a failure of server 202 triggers sedation server 206 to perform its sedation function. In one embodiment, each node in an HA configuration responds to both a private address that is unique to each node and a public address that is shared by all nodes. The public address, also referred to as the HA address, is an address that is associated with a service or with a node that provides that service. A client node seeking to make use of the service may send a service-related message addressed to the HA address.

In the embodiment illustrated in FIGS. 2A~C, server 202 and sedation server 206 are configured in a high-availability (HA) configuration in which messages that are addressed to a specified network address "X" will be sent to all nodes that are associated with the address X, i.e., both server 202 and sedation server 206, but only one of the nodes will respond to the message. For simplicity of description, however, messages that are sent to a HA node and that are ultimately discarded by the HA node will not be shown in FIGS. 2A~C. In the embodiment illustrated in FIGS. 2A~C, sedation server 206 may receive a periodic heartbeat message 210 from server 202. If sedation server 206 fails to receive a next heartbeat message within a specified time limit, sedation server 206 may assume that server 202 has failed and will perform a sedation function.

In one embodiment of HA, each node in the HA cluster receives a copy of these service-related messages, but only the currently active HA node responds. Since each node in the HA cluster receives a copy of the same message, the backup nodes may use the service-related messages to update subscription information, state tables, etc. In this manner, each backup node may remain wholly or partially in sync with the primary, eliminating or greatly reducing the time required for the backup node to become fully operational in response to a failover. Alternatively, server 202 may transmit synchronization data 212 to sedation server 206 in order for sedation server to be wholly or partially in sync with server 202. For example, server 202 may provide a presence service or another service for which the current status of a subscriber is maintained. If server 202 maintains information about the status of a subscriber, e.g., clients 204, server 202 may transmit synchronization data 212 to sedation server 206. In one embodiment, server 202 may update sedation server 206 whenever the status of a subscriber changes. In this way, sedation server 206 may maintain a list of subscribers and each subscriber's respective status.

Anycast address routing and HA clustering are two methods of handling failover and are intended to be illustrative and not limiting. Other failure detection/failover configurations may be used to trigger the sedation operations described herein. It will be appreciated that other redundant configurations are also within the scope of the subject matter described herein. In an alternative embodiment, for example, network 208 may include a router (not shown), which may implement anycast routing as described above with regard to system 100. The operation of system 200 will now be described in detail with reference to FIGS. 2B and 2C.

In the embodiment illustrated in FIG. 2B, server 202 has suffered a failure. Sedation server 206 detects the failure of server 202, by failing to receive a heartbeat message from server 202 within the specified time limit, for example. In response to detecting the failure of server 202, sedation server 206 will begin responding to requests sent from clients 204 that are addressed to address X. For as long as server 202 remains inoperative, sedation server 206 will respond to the requests, and, in FIG. 2C, sedation server 206 issues additional sedation messages as needed.

In the embodiment in FIG. 2C, for example, sedation server 206 may issue SIP 5XX response messages including a retry-after parameter. In the same manner described above with regard to system 100, the retry-after parameters may be manipulated so as to temporally distribute subscriptions retry requests and thus avoid flooding server 202 with requests.

In one embodiment, sedation server 206 may continue to receive request messages, such as subscription requests, on behalf of failed server 202, and may continue to send sedation messages. In one embodiment, sedation server 206 may maintain information about the number of subscription attempts made by subscription clients 204. For example, sedation server 206 may increase the retry-after or wait time in response to every resubscription attempt that fails, or it may allow only a certain number of attempts before sending a message to the subscription client instructing it to halt attempts at resubscription, or to halt until further notice.

In one embodiment, once server 202 recovers, sedation server 206 may detect the recovery of server 202, e.g., by resumed heartbeat messages from server 202 to sedation server 206. In response to the recovery of server 202, sedation server 206 may cease receiving or responding to subscription requests and cease generation of sedation messages.

Systems 100 and 200 are two embodiments for providing sedation service in a telecommunications network, illustrating differences in how the sedation function is triggered, as well as differences in how the failure is detected and by which node. For example, in system 100, the node that generates the sedation messages (SIP sedation server 106) is different from the node (router 108) that detects the failure of the service providing node (SIP proxy 102). In system 200, on the other hand, the same node (sedation server 206) both detects the failure of the service providing node (server 202) and generates the sedation messages. In system 100, sedation server 106 is triggered by receipt of query messages from router 108. In contrast, in system 200, sedation server 206 is triggered by a failure to receive a heartbeat message. Other implementations are considered within the scope of the subject matter described herein.

Furthermore, a sedation node can provide a variety of sedation services. For example, a sedation server may perform the functions of SIP sedation server 106, the functions of sedation server 206, other sedation functions, or some combination. In one embodiment, the sedation service may be performed in response to transient events in the telecommunication network, such as temporary outages or failures of nodes, datalinks or other communications paths, network services, network functions, etc.

Figure 3:
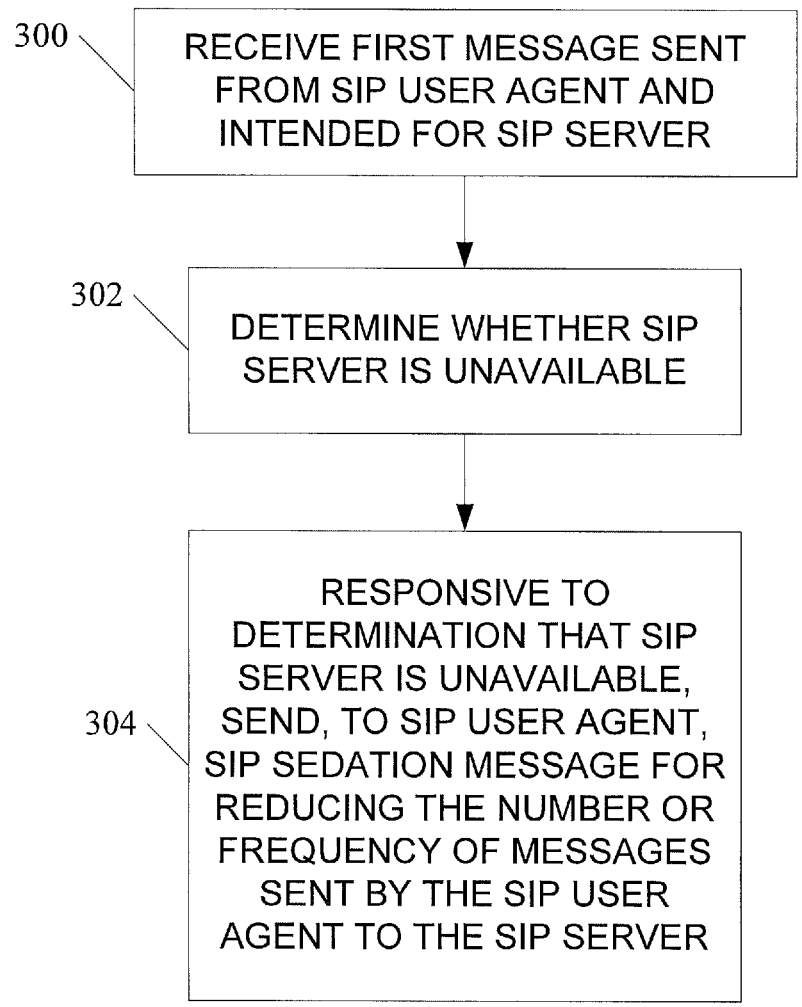
FIG. 3 is a flow chart illustrating an exemplary process providing sedation service in a telecommunications network according to an embodiment of the subject matter described herein.

FIG. 3 is a flow chart illustrating an exemplary process providing sedation service in a telecommunications network according to an embodiment of the subject matter described herein. Referring to FIG. 3, at block 300, a SIP sedation node receives a first message sent from a SIP user agent and intended for a SIP server. At block 302, it is determined whether the SIP server is unavailable. For example, router 106 in FIG. 1B may detect the failure of SIP proxy 102; sedation server 206 in FIG. 2A may detect the failure of server 202. At block 304, responsive to a determination that the SIP server is unavailable to respond to the first message, a SIP sedation message for reducing the number or frequency of messages sent by the SIP user agent to the SIP server is sent to the user agent. For example, SIP sedation server 106 may send SIP 5XX RETRY messages to clients 104 in response to indirect detection of the failure of SIP proxy 102, i.e., by starting to receive messages addressed to anycast address X, which router 108 formerly routed to SIP proxy 102 but now is routing to SIP sedation server 106.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing sedation service in a telecommunications network, the method comprising:
    at a session initiation protocol (SIP) sedation node:
        receiving a first message sent from a SIP user agent and intended for a SIP server, wherein the SIP sedation node and the SIP server simultaneously share a high availability Internet protocol (HA IP) address and wherein the first message from the SIP user agent is addressed to the HA IP address and is sent to both the SIP sedation node and the SIP server;
        determining whether the SIP server is unavailable;
        responsive to a determination that the SIP server is unavailable to respond to the first message, sending, to the SIP user agent, a SIP sedation message for reducing the number or frequency of messages sent by the SIP user agent to the SIP server, wherein the SIP sedation node and the SIP server are configured in a high availability configuration in which messages addressed to the HA IP address are sent to both the SIP sedation node and the SIP server and only one of the SIP sedation node and SIP server responds to each of the messages, wherein, in the high availability configuration, the SIP server functions as a currently active node that responds to the messages and wherein the SIP sedation node sends the sedation message responsive to a determination that the SIP server is unavailable to respond.

2. The method of claim 1 wherein the SIP sedation node comprises a SIP sedation server.

3. The method of claim 1 wherein the SIP sedation node provides at least one sedation service in the telecommunications network for at least one group of nodes within the telecommunications network.

4. The method of claim 1 wherein the telecommunications network supports at least one of an Internet protocol, SIP, a diameter protocol, a simple object access protocol (SOAP), a remote authentication dial in user service (RADIUS) protocol, a presence protocol, and a system signaling 7 (SS7) protocol.

5. The method of claim 1 wherein the first message comprises one of an Internet protocol (IP) message, a session initiation protocol (SIP) message, and a system signaling 7 (SS7) message.

6. The method of claim 1 wherein the first message comprises one of a registration request, a subscribe request, and an invite request.

7. The method of claim 1 wherein the SIP user agent comprises a SIP user agent client.

8. The method of claim 1 wherein the SIP server comprises at least one of a SIP application server, a SIP proxy server, a SIP user agent server, a SIP registrar, a presence server, and an Internet protocol multimedia subsystem (IMS) call session control function (CSCF).

9. The method of claim 1 wherein the message sent from the user agent and intended for the SIP server is received by a routing node, which sends the message to both the SIP server and the sedation node.

10. The method of claim 1 wherein a heartbeat message or the absence thereof is used to detect the failure of the SIP server node.

11. The method of claim 1 wherein the sedation message indicates an amount of time that the user agent should wait before sending a message to the SIP server or instructs the user agent not to send messages to the SIP server.

12. The method of claim 11 wherein the sedation message specifies the amount of time and wherein the amount of time comprises at least one of:
  a value that is the same for all nodes;
  a value that is unique to each node;
  a value that is based on a class of a client node;
  a constant value;
  a value that is programmatically determined; and
  a value that is randomly determined.

13. A system for providing sedation service in a telecommunications network, the system comprising:
  a session initiation protocol (SIP) sedation node that is configured for:
  receiving a first message sent from a SIP user agent and intended for a SIP server, wherein the SIP sedation node and the SIP server simultaneously share a high availability Internet protocol (HA IP) address and wherein the first message from the SIP user agent is addressed to the HA IP address and is sent to both the SIP sedation node and the SIP server;
  determining whether the SIP server is unavailable;
  responsive to a determination that the SIP server is unavailable to respond to the first message, sending, to the SIP user agent, a SIP sedation message for reducing the number or frequency of messages sent by the SIP user agent to the SIP server, wherein the SIP sedation node and the SIP server are configured in a high availability configuration in which messages addressed to the HA IP address are sent to both the SIP sedation node and the SIP server and only one of the SIP sedation node and SIP server responds to each of the messages, wherein, in the high availability configuration, the SIP server functions as a currently active node that responds to the messages and wherein the SIP sedation node sends the sedation message responsive to a determination that the SIP server is unavailable to respond.

14. The system of claim 13 wherein the sedation message comprises a session initiation protocol (SIP) message.

15. The system of claim 13 wherein the sedation message indicates an amount of time that the user agent should wait before sending a message to the SIP server or instructs the user agent not to send messages to the SIP server.

16. The system of claim 15 wherein the sedation message indicates an amount of time and wherein the amount of time comprises at least one of:
  a value that is the same for all nodes;
  a value that is unique to each node;
  a value that is based on a class of a client node;
  a constant value;
  a value that is programmatically determined; and
  a value that is randomly determined.

17. The system of claim 13 wherein the SIP server comprises at least one of a SIP proxy server, a SIP registrar, a SIP user agent server, an Internet protocol multimedia subsystem (IMS) call session control function (CSCF), and a presence server.

18. The system of claim 13 wherein the sedation message is sent to the SIP user agent in response to receiving, at the sedation node, a first message that was sent from the user agent and intended for the SIP server.

19. The system of claim 18 wherein the first message comprises a SIP message.

20. The system of claim 19 wherein the first message comprises one of a registration request, a subscribe request, and an invite request.

21. The system of claim 13 wherein the SIP user agent comprises a SIP user agent client.

22. The system of claim 13 wherein a heartbeat message or the absence thereof is used to detect the unavailability of the SIP server.

23. A non-transitory computer readable medium having stored thereon computer-executable instructions that when executed by the processor of a computer control the computer to perform steps comprising:
  at a session initiation protocol (SIP) sedation node:
  receiving a first message sent from a SIP user agent and intended for a SIP server, wherein the SIP sedation node and the SIP server simultaneously share a high availability Internet protocol (HA IP) address and wherein the first message from the SIP user agent is addressed to the HA IP address and is sent to both the SIP sedation node and the SIP server;
  determining whether the SIP server is unavailable;
  responsive to a determination that the SIP server is unavailable to respond to the first message, sending, to the SIP user agent, a SIP sedation message for reducing the number or frequency of messages sent by the SIP user agent to the SIP server, wherein the SIP sedation node and the SIP server are configured in a high availability configuration in which messages addressed to the HA IP address are sent to both the SIP sedation node and the SIP server and only one of the SIP sedation node and SIP server responds to each of the messages, wherein, in the high availability configuration, the SIP server functions as a currently active node that responds to the messages and wherein the SIP sedation node sends the sedation message responsive to a determination that the SIP server is unavailable to respond.

* * * * *